United States Patent [19]

Malzkorn et al.

[11] Patent Number: 4,610,583
[45] Date of Patent: Sep. 9, 1986

[54] HORIZONTAL DRILLING AND MILLING MACHINE

[75] Inventors: Matthias Malzkorn, Jüchen; Helmut Holz, Monchen-Gladbach, both of Fed. Rep. of Germany

[73] Assignee: Scharmann GmbH & Co., Munchen Gladbach, Fed. Rep. of Germany

[21] Appl. No.: 707,091

[22] Filed: Mar. 1, 1985

[30] Foreign Application Priority Data

Mar. 29, 1984 [DE] Fed. Rep. of Germany ....... 3411647

[51] Int. Cl.$^4$ .......................... B23C 1/12; B23B 39/14
[52] U.S. Cl. ...................................... 409/211; 74/342; 74/405; 74/665 GC; 74/665 H; 408/88; 408/89; 408/236; 409/201; 409/230; 409/241
[58] Field of Search ............... 409/215, 201, 211, 230, 409/240, 241; 408/46, 88, 89, 236; 29/26 A; 74/405, 384, 385, 665 GA, 665 GB, 665 GC, 665 H, 342

[56] References Cited

U.S. PATENT DOCUMENTS

| | | | |
|---|---|---|---|
| 3,448,656 | 6/1969 | Böttger et al. | 409/241 X |
| 4,378,621 | 4/1983 | Babel | 409/216 X |
| 4,559,682 | 12/1985 | Sachot | 409/211 X |

FOREIGN PATENT DOCUMENTS 579871 11/1977 U.S.S.R. .............................. 409/211

Primary Examiner—Gil Weidenfeld
Assistant Examiner—Steven C. Bishop
Attorney, Agent, or Firm—Becker & Becker, Inc.

[57] ABSTRACT

A horizontal drilling and milling machine having a spindle head which can be rotated about an axis set at 45° to a horizontal plane. The spindle head can be arrested in the horizontal and vertical working positions of the spindle sleeve by means of a support housing. The spindle sleeve can be driven via a gear system. The rotary movement of the spindle head is derived from the drive shaft for the spindle sleeve.

4 Claims, 6 Drawing Figures

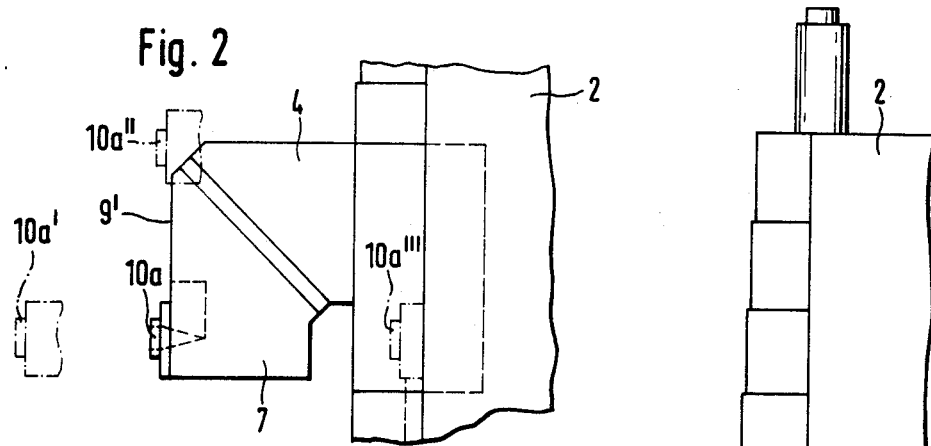
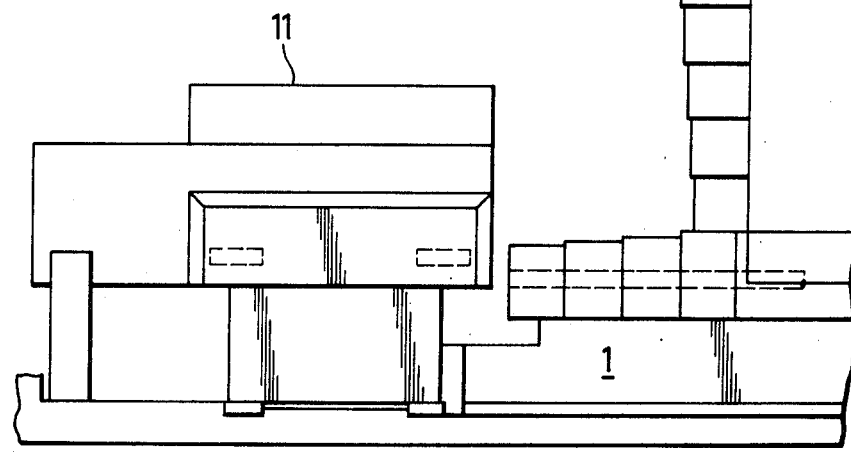

HORIZONTAL DRILLING AND MILLING MACHINE

BACKGROUND OF THE INVENTION

1. Field of the Invention

The present invention relates to a horizontal drilling and milling machine having a spindle head which can be rotated about an axis set at 45° relative to a horizontal plane; the spindle head can be arrested in the horizontal and vertical working positions of the spindle or spindle sleeve by means of the support housing, and the spindle sleeve can be driven by means of a gear system.

2. Description of the Prior Art

Horizontal drilling and milling machines of this general type are known from German Offenlegungsschrifts No. 26 13 736 and 22 52 366, as well as from U.S. Pat. No. 3,448,656, Böttger et al dated June 10, 1969. In these arrangements, the rotary movement of the spindle head is effected by means of a rack-and-pinion drive, or similarly by means of a linear piston. Piston-cylinder units and plate springs effect arresting and release of the rotatable spindle head, and movement of the latter on a supporting journal. Hirth-type serrations are used for securing the position of the spindle head.

An object of the present invention is to improve a horizontal drilling and milling machine of the aforementioned general type in such a way that the rotation and precise arresting of the spindle head relative to the support housing can be assured with structurally simple means.

BRIEF DESCRIPTION OF THE DRAWINGS

This object, and other objects and advantages of the present invention, will appear more clearly from the following specification in conjunction with the accompanying drawings, in which:

FIG. 1 shows one embodiment of the inventive horizontal drilling and milling machine with its support, headstock, and spindle head, with the spindle sleeve of the latter being illustrated in various vertical working positions;

FIG. 2 shows the spindle head with its spindle sleeve in various horizontal working positions;

SUMMARY OF THE INVENTION

Figure 3:
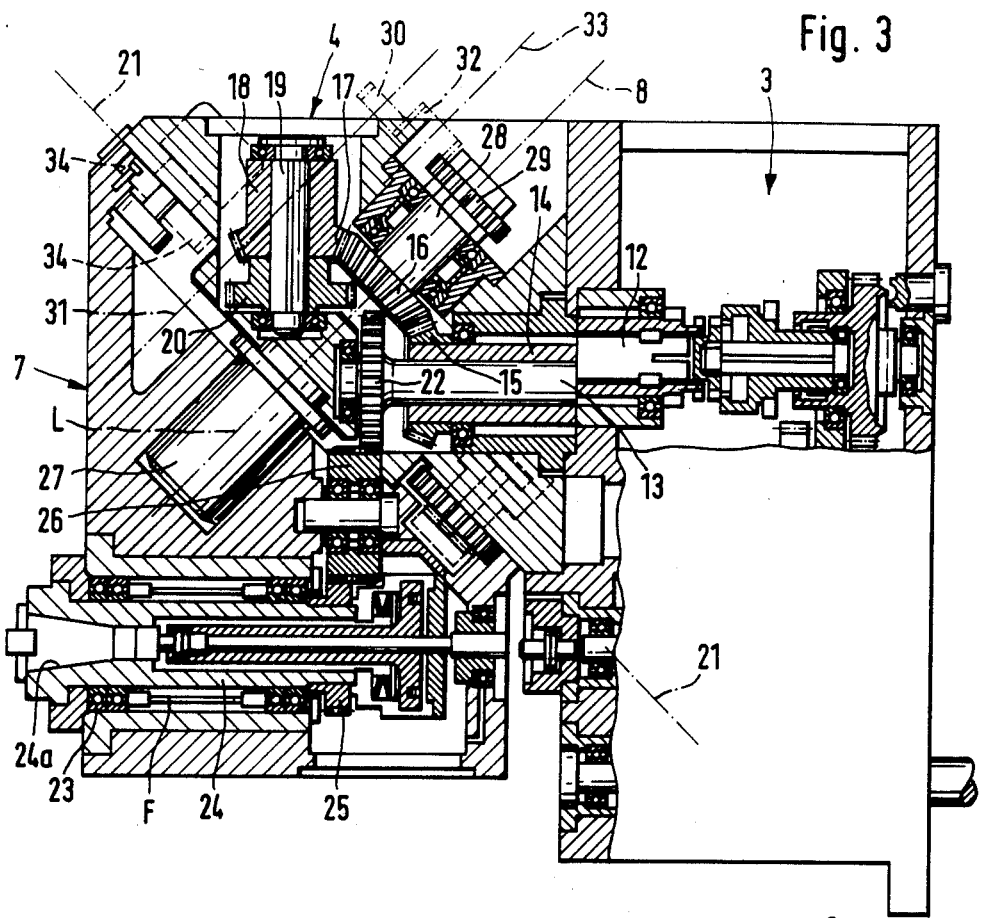
FIG. 3 is a vertical section through the support housing and the spindle head, with the spindle sleeve having assumed its horizontal end position.

The horizontal drilling and milling machine of the present invention is characterized primarily in that the rotational movement of the spindle head is derived from the spindle sleeve drive shaft of the support housing.

Pursuant to further features and specific embodiments of the present invention, the aforementioned drive shaft can be coupled with and uncoupled from the shaft which effects the rotary movement of the spindle head by means of an axially, longitudinally movable coupling gear. The spindle head may be provided with a toothing with which a gear or drive pinion engages, with the rotary movement of this pinion being effected via the coupling gear and a gear arrangement associated with the aforementioned drive shaft for the spindle sleeve. The toothing of the spindle head may be in the form of an internal toothing of a gear ring which is concentrically disposed about a supporting journal of the support housing, and which on a bottom side supports a portion of a toothed coupling. The support housing may be provided with a plurality of piston-cylinder units which are spaced equidistantly from one another concentrically about the aforementioned supporting journal. The piston rods of these piston-cylinder units support a disk having two gear rings, the cooperating gear rings of which are disposed on the support housing and on the gear ring which is connected with the spindle head and which is in constant engagement with the aforementioned drive pinion.

The advantage of the inventive horizontal drilling and milling machine consists in that only a single drive is necessary on the one hand for the rotary movement of the spindle head which supports the spindle or spindle sleeve, and on the other hand for the rotary movement of the spindle or spindle sleeve, despite the different speeds of rotation of these components; furthermore, a precise arresting of the spindle head is possible.

DESCRIPTION OF PREFERRED EMBODIMENTS

Referring now to the drawings in detail, the vertical support 2 can be roved horizontally on the base 1. The height of the headstock 3 is adjustable on the support 1. The front side, namely the left side in FIGS. 1 and 2, of the headstock 3 supports a support housing 4, which is provided with an area of contact 5 which is inclined at an angle of 45° to the horizontal. The spindle head 7 of the drilling and milling machine is provided with an identical area of contact 6; the spindle head 7 can revolve about an axis 8 which is also inclined at an angle of 45° to the horizontal. The spindle head supports the spindle sleeve 10, which projects out of the wall 9 of the spindle head; a tool can be inserted in the free end of the spindle sleeve 10.

Due to the fact that the support 2 can move in a horizontal plane, and that the headstock 3 can move in a vertical plane, the spindle sleeve, in its vertical position, can assume the individual positions 10, 10', 10", 10"', etc. If the spindle head 7 is rotated 180° about the axis 8, so that the wall 9 which initially faced downward moves into the vertical position 9' as shown in FIG. 2, the spindle sleeve assumes the horizontal position 10a, and can also assume the various positions 10a', 10a", 10a"', etc. due to the fact that the carriage and the headstock 3 can be moved. As a result, the nonillustrated work piece, which is clamped to the rotary table 11, can be machined from above and from all sides.

The headstock 3 is provided with a drive shaft 12 which transmits its rotary movement to a shaft 13 in the support housing 4. This shaft 13 supports a sleeve 14 which is rigidly connected thereto. That end of the sleeve 14 which faces the spindle head 7 is provided with a bevel gear 15 which is rigidly connected thereto. A further bevel gear 16 is disposed in the housing 4 in the axis 8 about which the spindle head 7 can rotate. The further bevel gear 16 meshes with a bevel gear 17 which is rigidly connected with a sleeve 18 which, in turn, is rigidly carried by a vertical shaft 19. Also rigidly connected to this shaft 19 is a spur gear 20 which is disposed in or in the vicinity of the interface 21 between the support housing 4 and the spindle head 7.

A spur gear 22 is provided on that end of the shaft 13 which is adjacent to the spindle head 7, and hence is provided in the immediate vicinity of the bevel gear 15. Furthermore, the spindle sleeve 24 is mounted in the spindle head 7 with the aid of the bearing 23. The spindle sleeve 24 rigidly carries a radially-toothed pinion 25, which meshes with a further, similar pinion 26.

Figure 4:
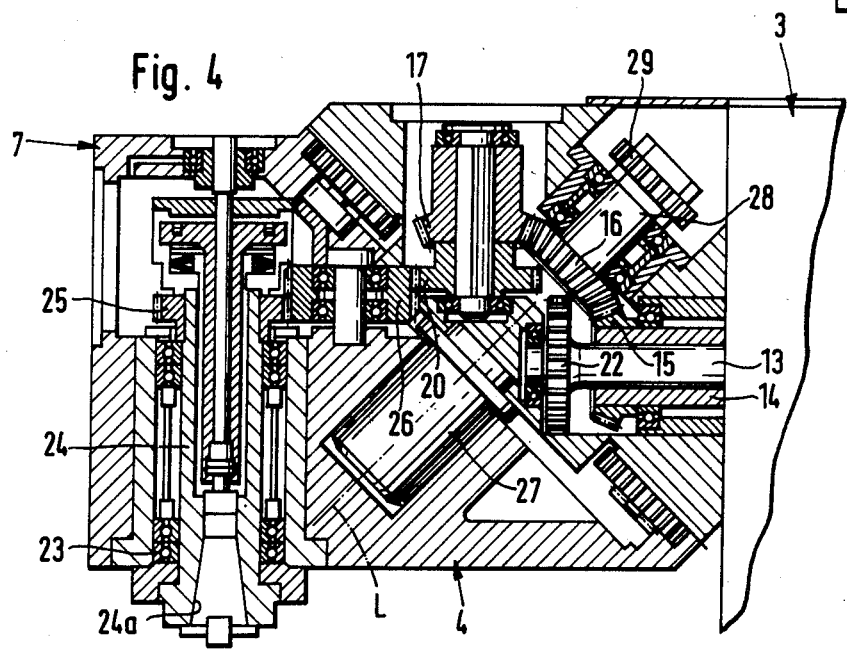
FIG. 4 is a vertical section through the support housing and the head, with the spindle sleeve having assumed its vertical end position.

In the position of the spindle head 7 illustrated in FIG. 3, the drive is effected from the shaft 13 via its spur gear 22 onto the pinion 26, and from there via the pinion 25 onto the spindle sleeve 24, into the tapered socket 24a of which a tool can be inserted. If, after being rotated 180° relative to the position shown in FIG. 3, the spindle head 7 is in the position shown in FIG. 4, in which the spindle sleeve 24 has a vertical orientation, the drive of the spindle sleeve 24 is effected from the shaft 13 via the bevel gear system 15, 16, 17 onto the spur gear 20, and from there via the two pinions 26, 25 onto the spindle sleeve 24.

The spindle head 7 can be moved back and forth in the direction of the axis 8, and can also be rotated about this axis. For this purpose, the support housing 4 is provided with a rigid supporting journal 27, which projects into the spindle head 7, and the longitudinal axis L of which is disposed in the axis 8. The rotary movement of the spindle head 7 about the supporting journal 27 is derived from the shaft 14. For this purpose, the shaft 28 which supports the bevel gear 16 rigidly supports a gear 29 with which is associated at the same level yet at a distance therefrom, a further gear 30 which is fixedly mounted on a shaft 31 which is disposed in the support housing 4 beyond the plane of the drawing of FIGS. 3 and 4. In order to be able to selectively rotate this shaft 31 when the spindle head 7 is to be rotated by 180° about the journal 27, a coupling gear 32 is provided which can be thrown into and out of gear with the gears 29, 30 when it is shifted along its shaft 33.

Rigidly mounted on the lower end of the shaft 31, facing the spindle head 7, is a gear 31a which has a specific width and is constantly in engagement with the internal toothing 35 of a gear ring 34, which is concentrically disposed about the supporting journal 27 and is mounted to the spindle head 7 by means of the screws 36. If, when the gear 32 is coupled, the shaft 31 is rotated, the spindle head 7 is also caused to rotate. Thus, the drive mechanism of the spindle sleeve 24 in its horizontal and its vertical positions, and for the rotation of the spindle head 7, is derived from the same drive shaft 14.

In order to precisely position and arrest the spindle head 7 in the horizontal or vertical position which it has achieved at any given time, and to release the spindle head 7 from these positions, preferably four piston-cylinder units 37 are provided in the support housing 4. These piston-cylinder units 37 are spaced equidistantly from one another in a circle concentrically about the supporting journal 27, and respectively have a cylinder housing 38 having a smaller cylinder space 39 as well as a larger cylinder space 40. A piston 41 disposed in the larger cylinder space 40 can be moved from its position in FIG. 5 into the position shown in FIG. 6, and vice versa. This movement of the piston 41 is effected by stressing the top 41a of the piston on the one hand, and by the action of the spring 43 which is disposed in the smaller cylinder space 39 between the bottom 42 thereof and the bottom 41b of the piston. The springs 43 of all of the piston-cylinder units 37 are collectively able to hold the spindle head 7 in its coupled position as shown in FIG. 6.

Each of the piston rods 44 of the piston-cylinder units 37 are provided with a disk 45, which together carry an inner gear ring 46 which, like the cooperating gear ring 47 on the bottom of the gear ring 34, is also concentrically disposed about the supporting journal 27. On that side which faces away from the gear ring 46, the disks 45 of the preferably four piston-cylinder units 37 are collectively provided with a gear ring 48, which is also concentric to the supporting journal 27; conforming in configuration and position to the gear ring 48 is a cooperating gear ring 49 on the bottom of a ring 51 which is mounted on the support housing 4 by means of screws 50. When the spindle head 7 assumes its arrested position, as illustrated in FIG. 6, it is sealed off relative to the support housing 4 by means of seals or gaskets 52, 53.

Figure 5:
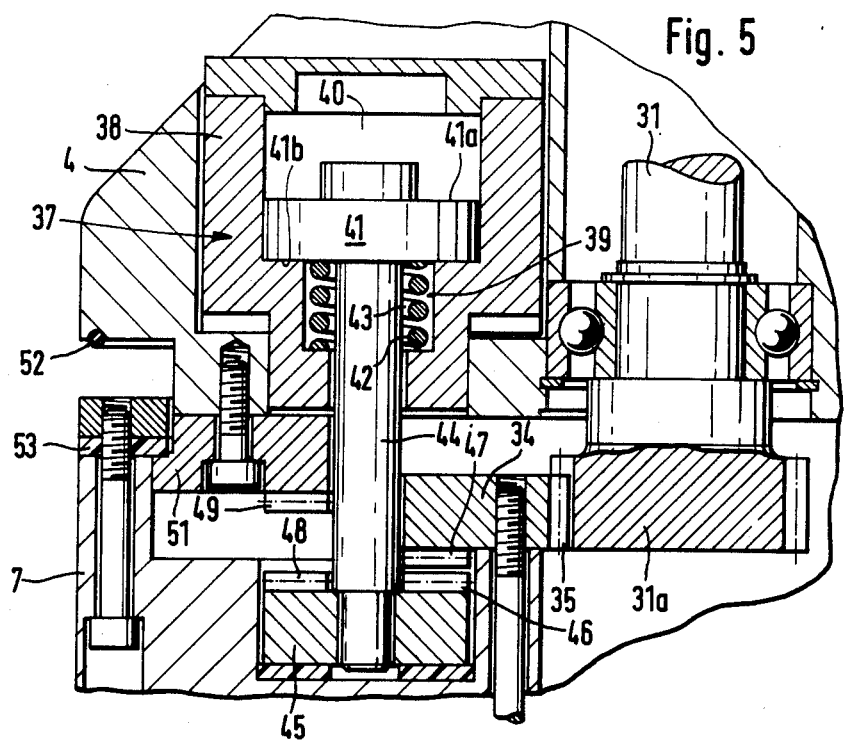
FIGS. 5 and 6 show the means for driving and arresting the spindle head in its two operating positions.
Figure 6:
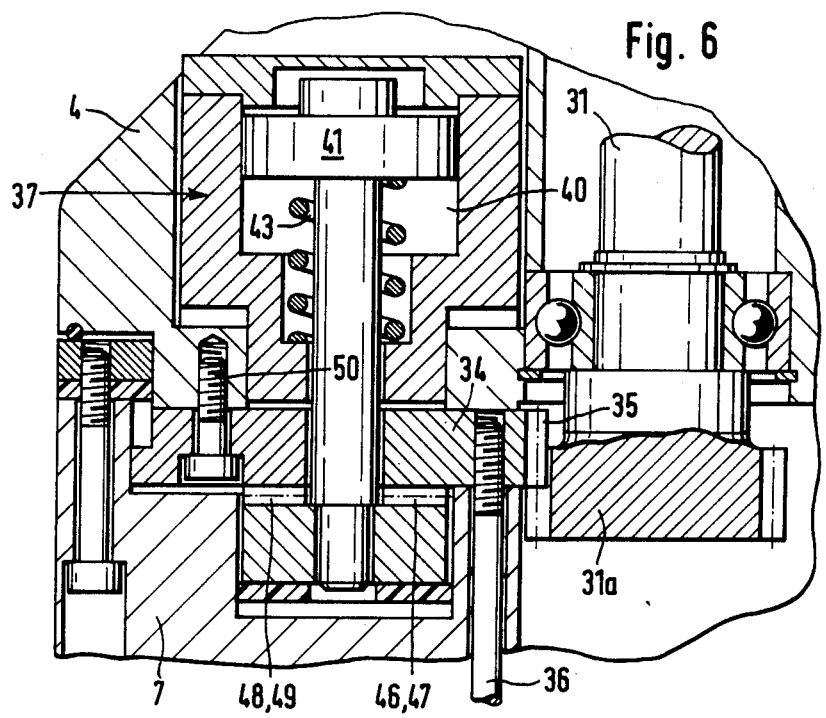

To rotate the spindle head 7 about the journal 27, the spaces 40 of the piston-cylinder units 37 are stressed, so that the disks 45 assume the position shown in FIG. 5, and the gear rings 46, 48 do not mesh with their cooperating gear rings 47, 49; upon rotation of the shaft 31, a rotation of the spindle head 7 can be effected with the aid of the gear 31a and the internal toothing 35 of the gear ring 34. If the pressure of the pistons 41 is released, the springs 43, with the aid of the piston rods 44, shift the disks 45 upwardly against the support housing 4, with the teeth of the gear 31a continuing to mesh with the teeth of the internal toothing 34 of the gear ring 35, and with the gear ring 46 engaging its cooperating gear ring 47 and the gear ring 48 engaging its cooperating gear ring 49 (see FIG. 6), so that the spindle head 7 is coupled with the support housing 4, and the shaft 31 is held securely in position.

The present invention is, of course, in no way restricted to the specific disclosure of the specification and drawings, but also encompasses any modifications within the scope of the appended claims.

What we claim is:

1. A horizontal drilling and milling machine, which has a spindle head which can be rotated about an axis set at 45° relative to a horizontal plane; said spindle head, which carries a rotatable spindls sleeve, can be arrested by means of a support housing in horizontal and vertical working positions of said spindle sleeve; a gear system, which includes a drive shaft rotatably mounted in said support housing, drives said spindle sleeve; said drilling and milling machine further comprises:

means for rotating said spindle head about an axis of rotation thereof in a rotational movement relative to said support housing, with said means being drivingly connectable to said drive shaft for deriving motive power therefrom; said means for rotating said spindle head including a shaft which effects the rotational movement of said spindle head, and also including an axially, longitudinally movable coupling gear by means of which said drive shaft can be selectively coupled with, and uncoupled from, said shaft which effects the rotational movement of said spindle head.

2. A drilling and milling machine according to claim 1, which includes a gear arrangement associated with at least a part of said gear system of said drive shaft; in which said shaft which effects the rotational movement of said spindle head is provided with a drive pinion, with rotary movement for said last-mentioned shaft, and hence for its drive pinion, being effected via said coupling gear and said gear arrangement; and in which said spindle head is provided with a toothing with which said drive pinion engages to impart rotary movement to said spindle head.

3. A drilling and milling machine according to claim 2, in which said support housing is provided with a supporting journal, a longitudinal axis of which is disposed on the axis of rotation of said spindle head, with said supporting journal projecting into the spindle head; and in which said toothing of said spindle head comprises a first gear ring, which is concentrically disposed about said supporting journal, and which has internal teeth for constantly engaging said drive pinion.

4. A drilling and milling machine according to claim 3, in which said support housing is provided with a plurality of piston-cylinder units which are concentrically disposed, equidistantly from one another, about said supporting journal; each of said piston-cylinder units has a piston rod which extends into said spindle head and is provided with a disk having a second and third gear ring; a first cooperating gear ring, for said second gear ring, is provided on said first gear ring of said spindle head, and a second cooperating gear ring, for said third gear ring, is provided on said support housing.

* * * * *